United States Patent
Sugimoto

(10) Patent No.: US 7,506,079 B2
(45) Date of Patent: Mar. 17, 2009

(54) DATA PROCESSOR AND DATA COMMUNICATION METHOD

(75) Inventor: Takashi Sugimoto, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 0 days.

(21) Appl. No.: 11/122,124

(22) Filed: May 5, 2005

(65) Prior Publication Data

US 2005/0198414 A1    Sep. 8, 2005

Related U.S. Application Data

(63) Continuation of application No. PCT/JP03/06744, filed on May 29, 2003.

(51) Int. Cl.
*G06F 3/00* (2006.01)
(52) U.S. Cl. ............................ 710/21; 710/22; 710/25; 710/29
(58) Field of Classification Search ............... 710/21, 710/22, 25, 29
See application file for complete search history.

(56) References Cited

U.S. PATENT DOCUMENTS

| 4,506,324 | A | * | 3/1985 | Healy | 703/21 |
| 4,975,832 | A | * | 12/1990 | Saito et al. | 710/23 |
| 5,408,613 | A | * | 4/1995 | Okabayashi | 709/234 |
| 5,933,413 | A | * | 8/1999 | Merchant et al. | 370/234 |
| 2002/0120795 | A1 | * | 8/2002 | Charlier | 710/33 |

FOREIGN PATENT DOCUMENTS

| JP | 59-099537 | 6/1984 |
| JP | 10-307747 | 11/1998 |
| JP | 2001-043181 | 2/2001 |
| JP | 2002-222161 | 8/2002 |
| JP | 63-158654 A | 1/2008 |

* cited by examiner

*Primary Examiner*—Niketa I Patel
*Assistant Examiner*—Jasjit S Vidwan
(74) *Attorney, Agent, or Firm*—Arent Fox LLP

(57) ABSTRACT

A data processor capable of preventing the occurrence of overrun, while efficiently performing DMA transfer. An SIO of a data processor starts the transmission of transmission data only when transmission data is stored in a transmission buffer and a reception buffer has no space available for data storage.

10 Claims, 7 Drawing Sheets

DATA PROCESSOR AND DATA COMMUNICATION METHOD

CROSS-REFERENCE TO RELATED APPLICATIONS

This non-provisional application is a continuation application of and claims the benefit of International Application No. PCT/JP03/06744, filed on May 29, 2003. The disclosure of the prior application is hereby incorporated herein in its entirety by reference.

BACKGROUND OF THE INVENTION

The present invention relates to a data processor and a data communication method, and more particularly, to a data processor and data communication method for performing data transfer through a direct memory access (DMA) process.

A data processor used in an information device system or the like is typically provided with a direct memory access controller (DMA controller) for reducing the load on its central processing unit (CPU) and improving the data transfer efficiency. When performing data transfer, a CPU cannot execute other calculation processes. However, by employing the direct memory access (DMA) transfer protocol, data transfer does not involve a CPU. Thus, data may be transferred at high speed. In a data processor incorporating such a DMA controller, it is required that data transfer be accurately performed.

FIG. 7 is a block circuit diagram showing a conventional data processor 1, and FIG. 8 is a timing chart thereof. The data processor 1 includes a CPU 2, a memory 3, a transmission DMA controller 4, a reception DMA controller 5, and a binary synchronous serial I/O device (SIO) 6, which are connected to one another by a system bus 7. In the data processor 1, data transfer and exchange of control signals are performed by way of the bus 7.

The data processor 1 includes a clock output terminal SCK, a transmission terminal DOUT, and a reception terminal DIN. In the data processor 1, the SIO 6 is connected to an external device (not shown) via the clock output terminal SCK, the transmission terminal DOUT, and the reception terminal DIN, so that serial data is exchanged with the external device via the terminals SCK, DOUT, and DIN. The circuit configuration of the external device is similar to that of the data processor 1.

The SIO 6, which includes a transmission buffer 8, a reception buffer 9, a transmission shift circuit 10, and a reception shift circuit 11, inputs and outputs data in accordance with the binary synchronous communication protocol. If the transmission buffer 8 is empty, the SIO 6 provides a first activation request signal TRA to the transmission DMA controller 4. If received data Rx (R1, R2, . . . in FIG. 8) is stored in the reception buffer 9, the SIO 6 provides a second activation request signal REC to the reception DMA controller 5. The activation request signals TRA and REC are sent from the SIO 6 to the DMA controllers 4 and 5 via exclusive signal lines L1 and L2, which are separate from the bus 7.

In response to the first activation request signal TRA, the transmission DMA controller 4 issues an occupation request signal DHLD to the CPU 2 to request occupation of the bus 7. After clearing the bus 7, the CPU 2 returns an occupation permission signal DACK to the transmission DMA controller 4 to permit occupation of the bus 7. The occupation request signal DHLD and the occupation permission signal DACK are transmitted via exclusive signal lines L3 and L4, which are separate from the bus 7.

Upon receiving the occupation permission signal DACK, the transmission DMA controller 4 reads transmitted data Tx (T1, T2, . . . in FIG. 8) out of the memory 3 and transfers the transmitted data Tx to the transmission buffer 8 of the SIO 6 via the bus 7. After the transfer, the transmitted data Tx is sent from the transmission buffer 8 to the transmission shift circuit 10. Then, the transmitted data Tx is transmitted from the transmission terminal DOUT in synchronization with a clock signal CLK provided from the clock output terminal SCK.

The SIO 6 receives the received data Rx at the same time as when transmitting the transmitted data Tx. The received data Rx is received by the reception terminal DIN and stored in the reception buffer 9 via the reception shift circuit 11. The received data Rx is stored in the reception buffer 9 when the SIO 6 completes the transmission and reception of data. Thus, the SIO 6 provides a second activation request signal REC to the reception DMA controller 5. In response to the second activation request signal REC, the reception DMA controller 5 issues an occupation request signal DHLD to the CPU 2. After clearing the bus 7, the CPU 2 returns an occupation permission signal DACK to the reception DMA controller 5. Upon receiving the occupation permission signal DACK, the reception DMA controller 5 transfers the received data of the reception buffer 9 to the memory 3.

As described above, the SIO 6 enables high-speed data communication by repeating the transmission and reception operations in accordance with the DMA transfer protocol. Japanese Laid-Open Patent Publication No. 2002-222161 describes a technique for transferring data at high-speeds during direct memory access process in a semiconductor device incorporating a DMA controller.

If transmission is carried out before the received data Rx stored in the reception buffer 9 of the SIO 6 is transferred, overrun will occur in the reception buffer 9. Therefore, to avoid overrun, the data processor 1 must give priority to reception DMA transfer over transmission DMA transfer.

However, some systems to which the data processor 1 is applied must give priority to processing by the CPU 2 over reception DMA transfer. In such systems, even if an occupation request signal DHLD is issued by the reception DMA controller 5 to request occupation of the bus 7, the CPU 2 will not permit occupation of the bus when the CPU 2 is executing processing, which has high priority, and will not output an occupation permission signal DACK. This suspends reception DMA transfer. If the transmission data stored in the transmission buffer 8 of the SIO 6 is transmitted during this suspension, data reception will simultaneously be performed. Thus, overrun will occur in the reception buffer 9.

FIG. 9 is a timing chart showing a case in which overrun occurs. As shown in FIG. 9, after the received data R2 from the reception shift circuit 11 is stored in the reception buffer 9, a second activation request signal REC is output by the SIO 6. In response to the second activation request signal REC, the reception DMA controller 5 issues an occupation request signal DHLD to the CPU 2. In this state, if the CPU 2 is executing processing, which has high priority, the CPU 2 will not permit bus occupation by the reception DMA controller 5. The CPU 2 outputs an occupation permission signal DACK only after completing the processing. Thus, the occupation permission signal DACK is not output during the period the CPU 2 is executing processing. This period defines a reception DMA suspension period X, during which the transfer operation of the received data by the reception DMA controller 5 is suspended.

If transmission data T3 is stored in the transmission buffer 8 in the reception DMA suspension period X, the transmission data T3 is sent to the transmission shift circuit 10 and then transmitted synchronously with a clock signal CLK. In this case, the reception buffer 9, which has already stored the received data R2, will receive the subsequent received data R3 and cause overrun. As a result, the received data R2 which has not yet been read by the reception DMA controller 5 will be destroyed by the subsequent received data R3.

The data processor 1 is provided with a single SIO 6. However, a data processor provided with a plurality of SIOs 6 has also been put to practical use. In the case of such a data processor, the DMA transfer by a certain SIO will be suspended not only when the CPU 2 is executing processing, which has high priority, but also when another SIO is performing data transfer. This increases the possibility of overruns occurring. In other words, if the bus 7 is not cleared for DMA transfer due to other processing than DMA transfer by the SIO 6, it will pose a problem of overrun as shown in FIG. 9.

The occurrence of overrun may be avoided by lowering the priority level of the high priority processing executed by the CPU 2 to a level lower than the priority level of the DMA transfer. However, if the priority level of the processing executed by the CPU 2 is lowered, the CPU 2 will not be able to execute accurate processing precisely and the processing efficiency will be decreased. When a plurality of SIOs 6 are employed, even if priority is given to DMA transfer operations of the SIOs 6, overrun will occur in one of the DMA transfer operations.

SUMMARY OF THE INVENTION

One aspect of the present invention is a data processor including a bus. A central processing unit is connected to the bus. A memory is connected to the bus. A serial I/O device is connected to the bus for simultaneously transmitting and receiving data in accordance with a binary synchronous communication protocol. The serial I/O device generates a first activation request signal and a second activation request signal. A transmission direct memory access controller is connected to the bus for transferring transmission data from the memory to the serial I/O device by performing a direct memory access process in response to the first activation request signal from the serial I/O device. A reception direct memory access controller is connected to the bus for transferring received data from the serial I/O device to the memory by performing the direct memory access process in response to the second activation request signal from the serial I/O device. The serial I/O device includes a transmission buffer in which the transmission data is stored and a reception buffer in which the received data is stored. A control circuit, connected to the transmission buffer and the reception buffer, for when the transmission data is stored in the transmission buffer and there is space available for data storage in the reception buffer, starting transmission of the transmission data stored in the transmission buffer.

Another aspect of the present invention is a communication method using a data processor including a bus, a central processing unit connected to the bus, a memory connected to the bus, a serial I/O device connected to the bus for simultaneously transmitting and receiving data in accordance with a binary synchronous communication protocol, a transmission direct memory access controller connected to the bus for transferring transmission data from the memory to the serial I/O device by performing a direct memory access process in response to a first activation request signal from the serial I/O device, and a reception direct memory access controller connected to the bus for transferring received data from the serial I/O device to the memory from the serial I/O device by performing the direct memory access process in response to a second activation request signal. The serial I/O device has a transmission buffer for storing the transmission data and a reception buffer for storing the received data. The communication method includes checking whether starting conditions, including the transmission buffer storing the transmission data and the reception buffer having space available for data storage, are satisfied, and starting transmission of the transmission data when the starting conditions are satisfied.

A further aspect of the present invention is a binary synchronous serial I/O device for use in a data processor. The data processor includes a transmission direct memory access controller for reading transmission data stored in a memory in accordance with a direct memory access process. A reception direct memory access controller stores received data provided from an external circuit of the data processor in the memory by performing a direct memory access process. A bus connects the binary synchronous serial I/O device, the memory, the transmission direct memory access controller, and the reception direct memory access controller. The binary synchronous serial I/O device includes a transmission buffer, connected to the bus, for temporarily storing the transmission data. A reception buffer connected to the bus temporarily stores the received data. A transmission control circuit connected to the transmission buffer and the reception buffer provides the transmission direct memory access controller with a first activation request signal for activating the transmission direct memory access controller when starting conditions including the transmission buffer storing the transmission data and the reception buffer having space available for data storage are satisfied. A reception control circuit connected to the transmission buffer and the reception buffer provides the reception direct memory access controller with a second activation request signal for activating the reception direct memory access controller when data is stored in the reception buffer.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A data processor according to a preferred embodiment of the present invention will now be described with reference to the drawings.

Figure 1:
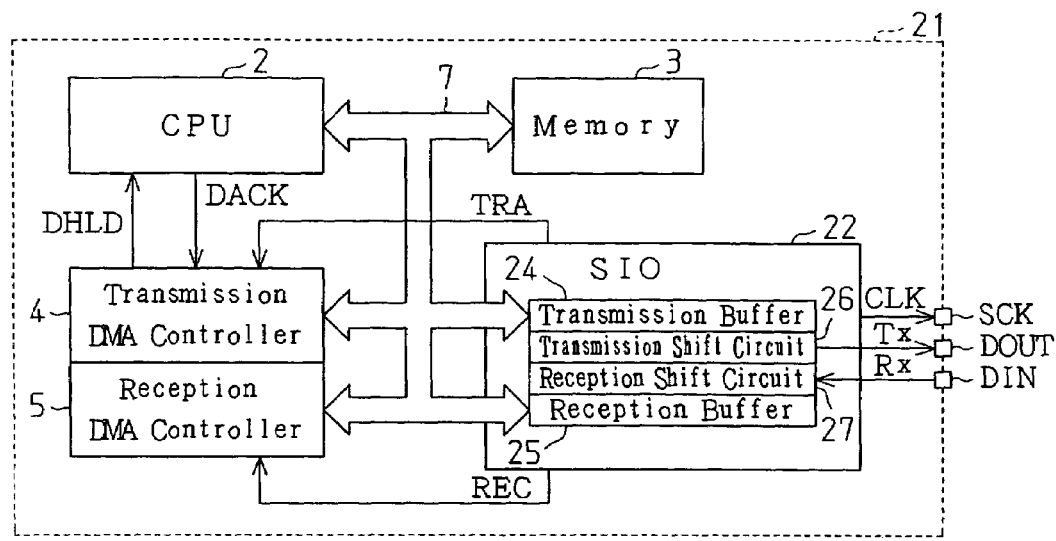
FIG. 1 is a block circuit diagram showing a data processor according to a preferred embodiment of the present invention.
Figure 7:
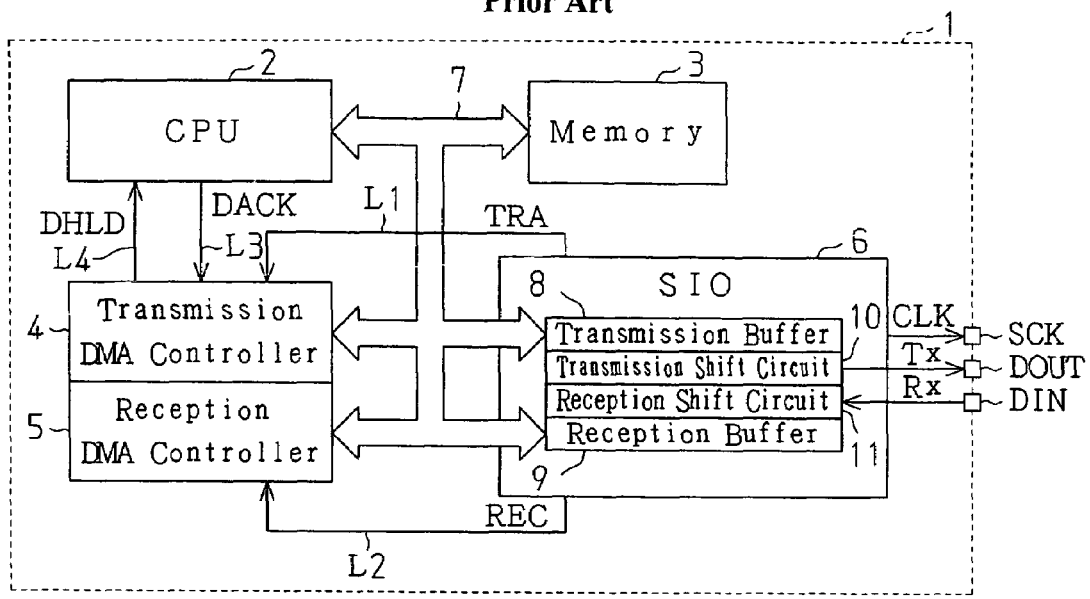
FIG. 7 is a block circuit diagram showing a conventional data processor.

FIG. 1 is a block circuit diagram showing a data processor 21. The data processor 21 includes a central processing unit (CPU) 2, a memory 3, a transmission DMA controller 4, a reception DMA controller 5, and a binary synchronous serial I/O device (SIO) 22, which are connected to one another by a common system bus 7. The CPU 2, the memory 3, the transmission DMA controller 4, and the reception DMA controller 5 of the data processor 21 shown in FIG. 1 are substantially the same as those of the data processor 1 in FIG. 7. However, the SIO 22 is different from that of FIG. 7.

Figure 2:
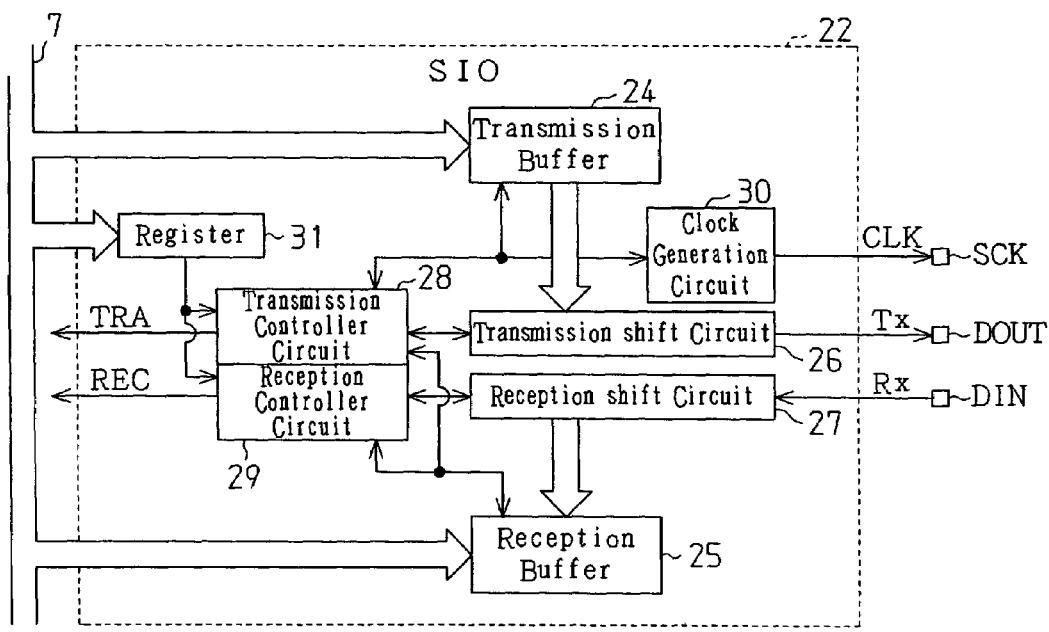
FIG. 2 is a block circuit diagram showing an SIO of the data processor in FIG. 1.

FIG. 2 is a block circuit diagram of the SIO 22. The SIO 22 includes a transmission buffer 24, a reception buffer 25, a transmission shift circuit 26, a reception shift circuit 27, a transmission control circuit 28, a reception control circuit 29, a clock generation circuit 30, and a register 31. The operation modes of the SIO 22 include a CPU mode, in which the CPU 2 performs data transmission and reception through interrupts, and a DMA mode, in which the DMA controllers 4 and 5 perform data transmission and reception by performing a direct memory access process without involving the CPU 2. Information related to the operation modes of the SIO 22 is registered in the register 31. The information for the operation modes is registered in the register 31 via the bus 7 when the data processor 1 is activated and the CPU 2 is initialized.

The transmission control circuit 28 is a circuit that controls transmission operations in the SIO 22 and is connected to the transmission buffer 24, the reception buffer 25, the transmission shift circuit 26, the clock generation circuit 30, and the register 31. The reception control circuit 29 is a circuit that controls reception operations in the SIO 22 and is connected to the reception buffer 25, the reception shift circuit 27, and the register 31.

When the transmission control circuit 28 refers to the transmission buffer 24 and determines that the transmission buffer 24 is empty and there is space available for data storage in the transmission buffer 24 while the SIO 22 operates in the DMA mode, the transmission control circuit 28 provides a first activation request signal TRA to the transmission DMA controller 4. The transmission DMA controller 4 is activated in response to the first activation request signal TRA and reads transmission data from the memory 3. The transmission data is transferred to the transmission buffer 24 via the bus 7 and then sent to the transmission shift circuit 26 from the transmission buffer 24. The transmission control circuit 28 activates and causes the clock generation circuit 30 to generate a clock signal CLK. Transmitted data Tx in the transmission shift circuit 26 is transmitted from the transmission terminal DOUT in synchronization with the clock signal CLK.

Since the SIO 22 receives and transmits data simultaneously, received data Rx input from the reception terminal DIN is stored in the reception buffer 25 via the reception shift circuit 27. In this state, the reception control circuit 29 provides a second activation request signal REC to the reception DMA controller 5. The reception DMA controller 5 is activated in response to the second activation request signal REC and reads the received data from the reception buffer 25. The received data is transferred to the memory 3 via the bus 7.

In this embodiment, the transmission control circuit 28 refers to the reception buffer 25 and transmits data on the condition that the reception buffer 25 is empty, that is, there is space available for data storage in the reception buffer 25. This prevents overrun from occurring in the reception buffer 25.

Figure 3:
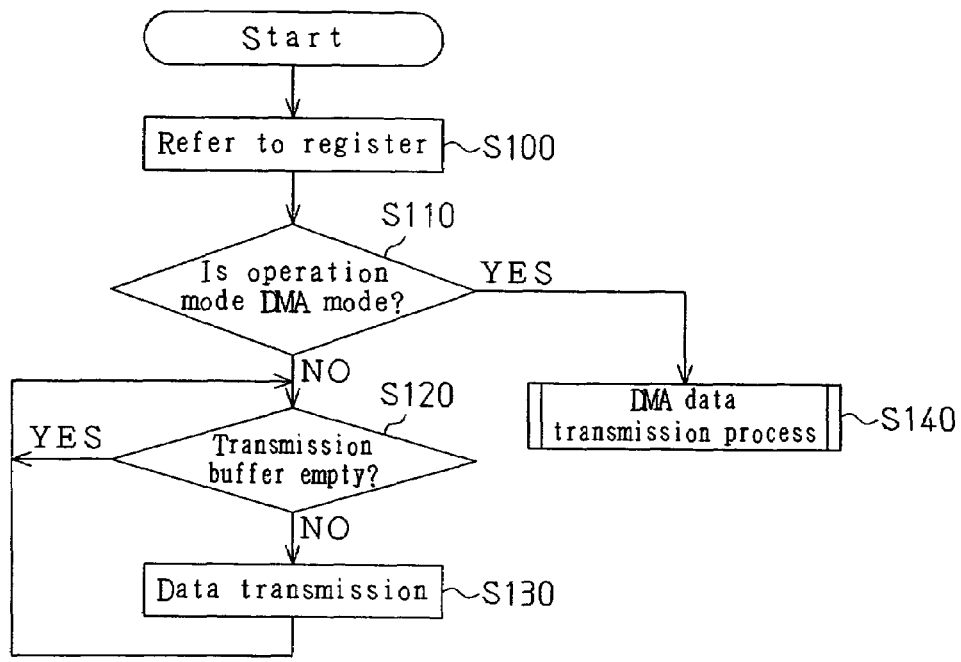
FIG. 3 is a flowchart showing a transmission operation of the SIO.

The transmission operation of the data processor 21 will now be described. FIG. 3 is a flowchart showing the transmission processing executed by the transmission control circuit 28 of the SIO 22.

The CPU 2 initializes the data processor 21 by first registering in a register (not shown) of the transmission DMA controller 4 information, such as information for the memory 3 that functions as the transfer source for the transmission DMA controller 4, information for the SIO 22 that functions as the transfer destination, and the amount of transfer data. The CPU 2 also registers the operation mode of the SIO 22 in the register 31 of the SIO 22. Then, the CPU 2 activates the SIO 22 and starts the processing of FIG. 3.

In step S100 in FIG. 3, the transmission control circuit 28 refers to the register 31 to check the operation mode. In step S110, the transmission control circuit 28 determines whether or not the operation mode is the DMA mode. If the operation mode is the CPU mode (NO in step S110), the transmission control circuit 28 determines in step S120 whether or not the transmission buffer 24 is empty. If the transmission buffer 24 is empty (YES in step S120), the transmission control circuit 28 waits until the transmission data is stored in the transmission buffer 24. In this state, if the transmission data is transferred to the transmission buffer 24 due to an interrupt by the CPU 2, the transmission control circuit 28 performs data transmission in step S130. In other words, the transmission control circuit 28 sends the transmission data in the transmission buffer 24 to the transmission shift circuit 26, while at the same time it has the clock generation circuit 30 output a clock signal CLK. Thus, the transmission data is transmitted from the transmission shift circuit 26 to an external device via the transmission terminal DOUT. After the data transmission, the transmission control circuit 28 repeats the processing of steps S120 and S130.

Figure 4:
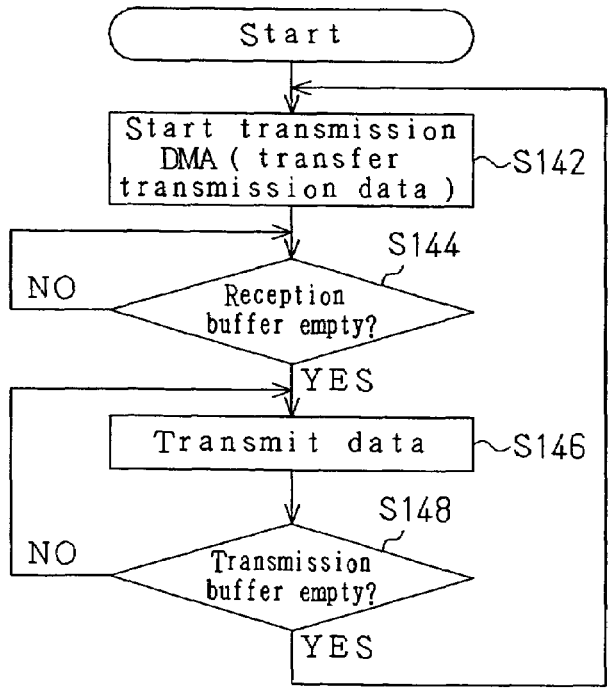
FIG. 4 is a flowchart showing data transmission processing of the DMA.

If the operation mode is the DMA mode (YES in step S110), the transmission control circuit 28 proceeds to step S140 and performs data transmission processing in accordance with the direct memory access (DMA) protocol. FIG. 4 illustrates the data transmission processing. Since the transmission buffer 24 is empty immediately after the activation of the SIO 22, the transmission control circuit 28 outputs, in step S142 in FIG. 4, a first activation request signal TRA for activating the transmission DMA controller 4. The transmission DMA controller 4 is activated by the first activation request signal TRA, reads transmission data from the memory 3, and transfers the transmission data to the transmission buffer 24.

In step S144, the transmission control circuit 28 refers to the reception buffer 25 to check whether or not the reception buffer 25 is empty. The processing is suspended in step S144 until the reception buffer 25 becomes empty (until space for data storage becomes available). If the reception buffer 25 is empty (YES in step S144), the transmission control circuit 28 starts transmission of the transmission data in step S146. In other words, the transmission control circuit 28 sends the transmission data in the transmission buffer 24 to the transmission shift circuit 26, while at the same time has the clock generation circuit 30 output a clock signal CLK. This sends the transmission data in the transmission shift circuit 26 to an external device via the transmission terminal DOUT.

In step S148, the transmission control circuit 28 checks whether or not the transmission buffer 24 is empty. If the transmission buffer 24 is not empty (NO in step S148), the processing returns to step S146 and the transmission control circuit 28 executes data transmission again. When the transmission buffer 24 is empty (YES in step S148), the transmission control circuit 28 repeats the processing of steps S142 to S148.

Figure 5:
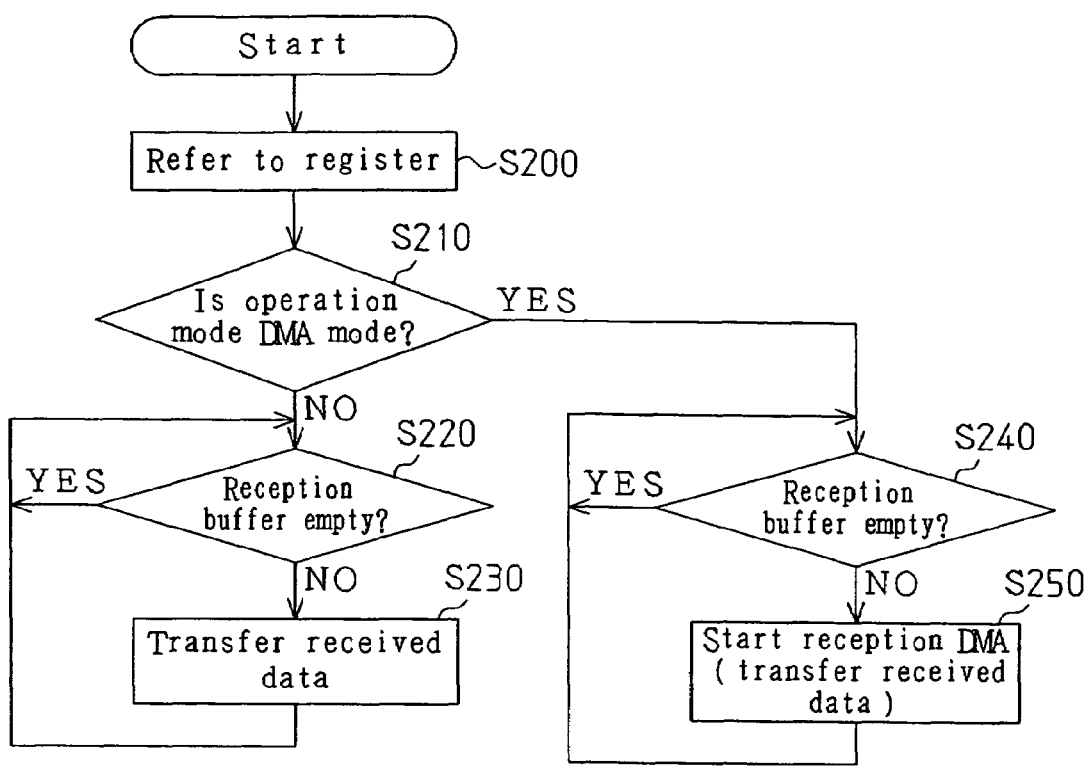
FIG. 5 is a flowchart showing a reception operation of the SIO.

The reception operation according to the preferred embodiment will now be described. FIG. 5 is a flowchart showing the reception processing executed by the reception control circuit 29 of the SIO 22. Initialization of the CPU 2 registers information for the reception buffer 25 that functions as the transfer source, the memory 3 that functions as the transfer destination, and the amount of transfer data in a register (not shown) of the reception DMA controller 5. The CPU 2 activates the SIO 22 after the registration. This starts the processing of FIG. 5.

As shown in FIG. 5, the reception control circuit 29 refers to the register 31 to check the operation mode in step S200, and determines whether or not the operation mode is the DMA mode in step S210. If the operation mode is CPU mode (NO in step S210), then the reception control circuit 29 checks in step S220 whether or not the reception buffer 25 is empty. The processing is suspended at step S220 until received data is stored in the reception buffer 25.

By performing data transmission and data reception simultaneously, the received data at the reception terminal DIN is stored in the reception buffer 25 via the reception shift circuit 27. In this state, the reception control circuit 29 performs transfer processing with the received data in step S230. During the transfer processing, an interrupt signal to the CPU 2 is issued. In response to the interrupt signal, the CPU 2 reads the received data from the reception buffer 25 via the bus 7 and stores the data in the memory 3. After the processing in step S230, the reception control circuit 29 returns to step S220 and repeats the processing of steps S220 and S230.

If it is determined in step S210 that the operation mode is the DMA mode (YES in step S210), the reception control circuit 29 proceeds to step S240 and performs data reception by executing the direct memory access process. More specifically, the reception control circuit 29 determines, in step S240, whether or not the reception buffer 25 is empty and waits until received data is stored in the reception buffer 25.

Then data transmission is simultaneously performed with data reception. When the received data is stored in the reception buffer 25, the reception control circuit 29 outputs, in step S250, a second activation request signal REC for activating the reception DMA controller 5. The reception DMA controller 5 is activated by the second activation request signal REC, and the received data is read from the reception buffer 25 and transferred to the memory 3. Thereafter, the reception control circuit 29 returns to step S240 and repeats the processing in steps S240 and S250.

In the preferred embodiment, the data processor 21 does not start data transmission from the SIO 22 immediately after the transmission data is transferred to the transmission buffer 24 by the transmission DMA controller 4. The data processor 21 starts transmission only after confirming that there is no received data in the reception buffer 25. Accordingly, the data transmission is started on the conditions that the transmission data is stored in the transmission buffer 24 and that there is space available for data storage in the reception buffer 25. As a result, the occurrence of overrun in the reception buffer 25 as observed in the prior art is prevented.

Figure 6:
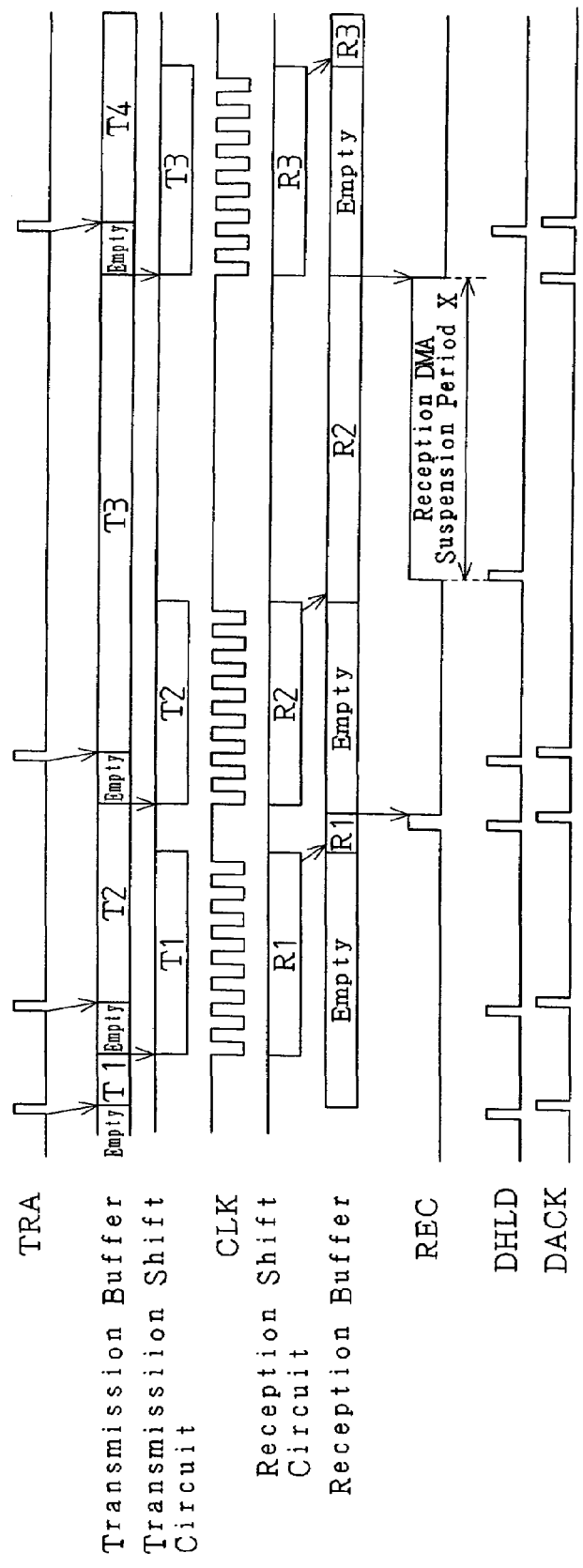
FIG. 6 is a timing chart of the data processor.
Figure 9:
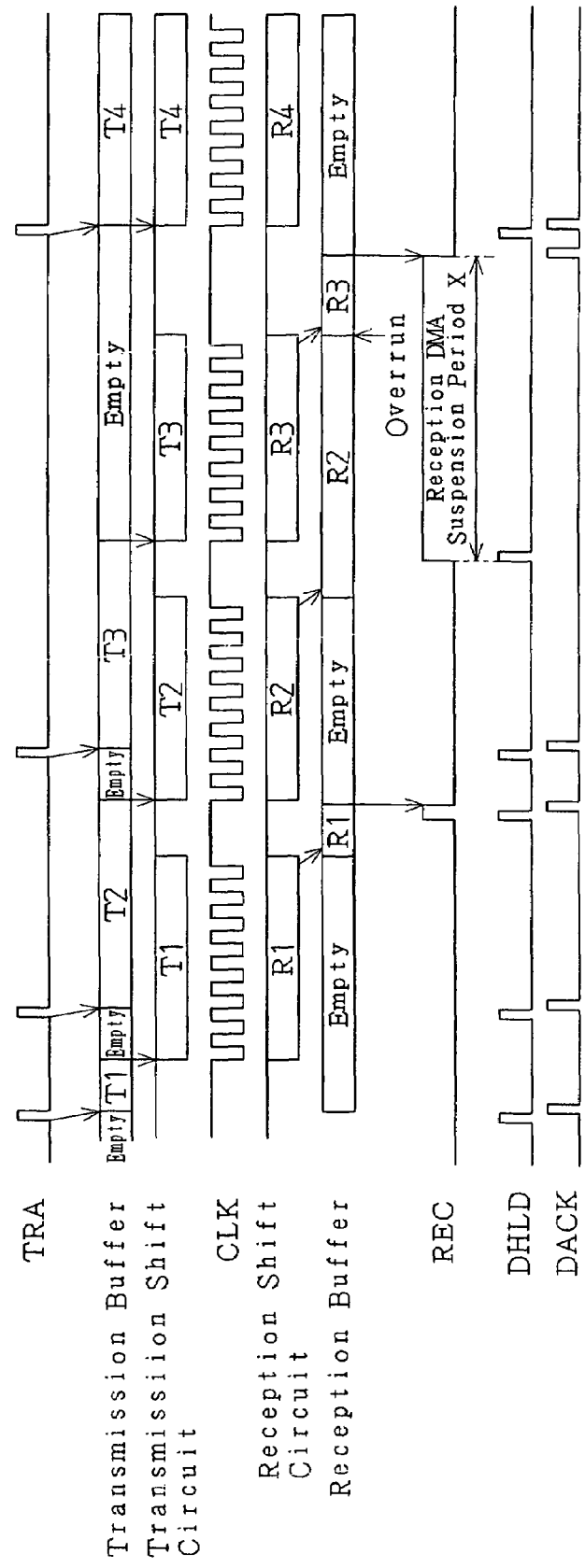
FIG. 9 is a timing chart taken when overrun has occurred.

FIG. 6 shows an operation example. In the operation example of FIG. 6, like the operation example of FIG. 9, a second activation request signal REC is output by the SIO 22 when the received data R2 from the reception shift circuit 27 is stored in the reception buffer 25. In response to the second activation request signal REC, the reception DMA controller 5 issues an occupation request signal DHLD to the CPU 2. In this state, the CPU 2 is executing processing having high priority and thus does not permit the reception DMA controller 5 to occupy the bus. The CPU 2 outputs an occupation permission signal DACK only after completing the processing. No occupation permission signal DACK is output during the execution of the processing by the CPU 2. This period defines a reception DMA suspension period X, during which the transfer operation of the received data by the reception DMA controller 5 is suspended.

In this embodiment, the received data R2 is stored in the reception buffer 25 during the reception DMA suspension period X. This suspends transmission of the transmission data T3 by the transmission buffer 24. Thus, during the reception DMA suspension period X, no transmission data T3 is sent to the transmission shift circuit 26, and no clock signal CLK is output from the clock generation circuit 30. This prevents overruns from occurring in the reception buffer 25.

When the CPU 2 completes processing, which has high priority, the CPU 2 outputs an occupation permission signal DACK. This activates the reception DMA controller 5, and the received data R2 in the reception buffer 25 is transferred to the memory 3. As a result, the reception buffer 25 is emptied and the transmission of the transmission data T3 in the transmission buffer 24 is started.

Figure 8:
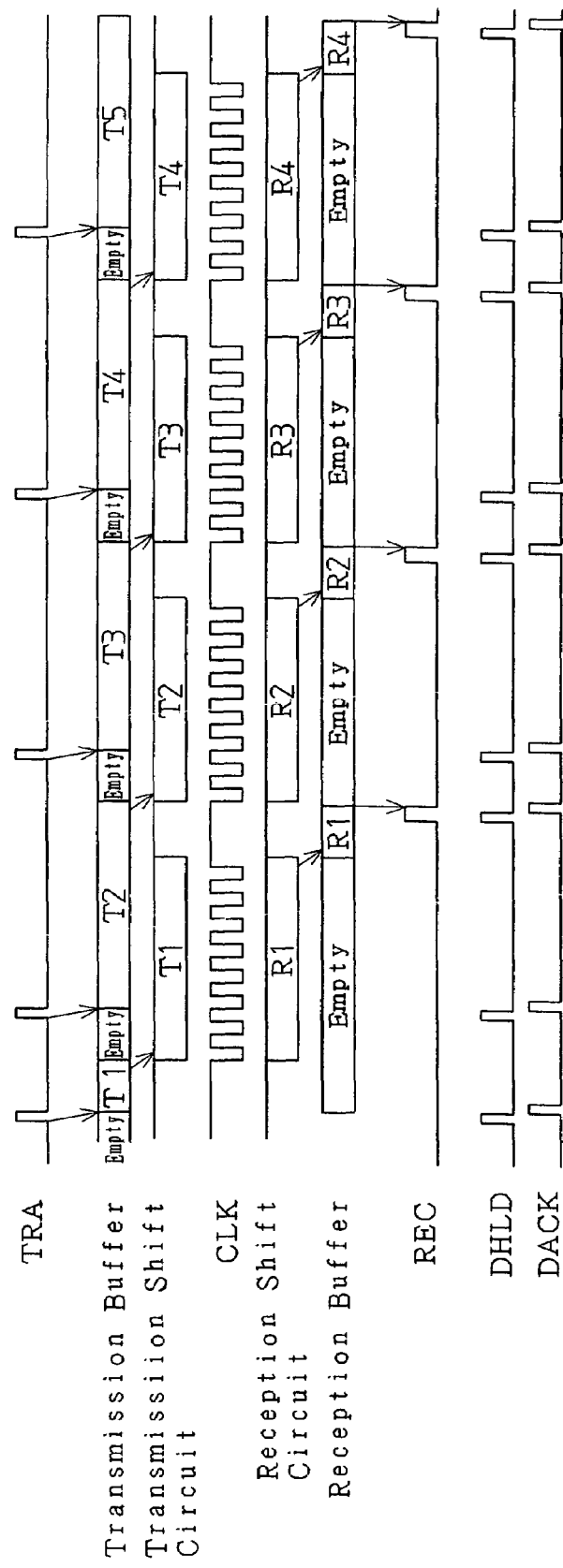
FIG. 8 is a timing chart of the data processor in FIG. 7 during normal communication.

If the CPU 2 does not inhibit the clearing of the bus 7, the data processor 21 in this embodiment operates as shown in the timing chart of FIG. 8 in the same manner as the conventional data processor 1. In other words, data transfer is performed at a high speed by performing the same DMA as in the prior art.

The data processor 21 of the preferred embodiment has the advantages described below.

(1) When the operation mode of the SIO 22 is set to the DMA mode so that data is transmitted and received by the SIO 22 in accordance with the direct memory access process, data transmission is started on the conditions that transmission data is stored in the transmission buffer 24 and the reception buffer 25 is empty (space is available for data storage). Due to these conditions, the data transmission and reception operations of the SIO 22 are temporarily suspended until the received data in the reception buffer 25 is read by the reception DMA controller 5. This prevents overruns from occurring in the reception buffer 25.

(2) When the operation mode of the SIO 22 is set to the CPU mode so that data is transmitted and received by the SIO 22 in interrupts by the CPU 2, data transmission is started when transmission data is stored in the transmission buffer 24. In other words, the conditions for starting the DMA mode, which include transmission data being stored in the transmission buffer and space being available for data storage in the reception buffer, are invalidated. An overrun occurs in the data processor 21 when the data transmitted and received by the SIO 22 is transferred through the direct memory access process. Accordingly, when data is transferred in interrupts by the CPU 2, the data transfer is accurately performed by invalidating the above mentioned starting conditions.

(3) The SIO 22 is provided with the register 31 so that the operation mode is registered in the register 31 by the CPU 2 during initialization of the data processor 21. The initialization enables the operation mode of the SIO 22 to be changed in accordance with the system to which the data processor 21 is applied. This is preferable from a practical viewpoint.

It should be apparent to those skilled in the art that the present invention may be embodied in many other specific forms without departing from the spirit or scope of the invention. Particularly, it should be understood that the present invention may be embodied in the following forms.

The data processor 21 may be provided with a plurality of SIOs 22.

The quantity of the transmission buffer 24 and the reception buffer 25 provided in the SIO 22 is not each limited to one. The SIO 22 may be provided with a plurality of transmission buffers 24 and a plurality of reception buffers 25. In this case, the transmission control circuit 28 determines that there is space available for data storage if any one of the transmission buffers 24 is empty and outputs a first activation request signal TRA. The reception control circuit 29 outputs a second activation request signal REC when received data is stored in any one of the reception buffers 25. The transmission control circuit 28 determines that there is space available for data storage if any one of the reception buffers 25 is empty and then starts transmitting data for the transmission buffers 24. This prevents overruns from occurring in the reception buffers 25.

Instead of the transmission control circuit 28 for controlling the transmission operation and the reception control circuit 29 for controlling the reception operation, a single control circuit may be employed to control both of the transmit and reception operations.

The transmission control circuit 28 refers to the reception buffer 25 and stops data transmission if received data is stored in the reception buffer 25. However, the present invention is not limited to such structure. For example, when the processing by the CPU 2 is given priority over the data transfer by the reception DMA controller 5 in the data processor 21 (during the reception DMA suspension period X in FIG. 6), a second activation request signal REC may be output to the reception DMA controller 5. When the second activation request signal REC is output, the reception buffer 25 stores received data. Therefore, the transmission control circuit 28 determines that there is no space available for data storage based on the second activation request signal REC and suspends data transmission. This also preventing overruns from occurring in the reception buffer 25.

The present examples and embodiments are to be considered as illustrative and not restrictive, and the invention is not to be limited to the details given herein, but may be modified within the scope and equivalence of the appended claims.

What is claimed is:

1. A data processor comprising:
a bus;
a central processing unit coupled to the bus;
a memory coupled to the bus;
a serial I/O device connected to the bus and connectable to an external device for simultaneously transmitting and receiving data to and from the external device, the serial I/O device generating a first activation request signal and a second activation request signal;
a transmission direct memory access controller coupled to the bus for transferring transmission data, which is to be transmitted to the external device, from the memory to the serial I/O device; and
a reception direct memory access controller coupled to the bus for transferring received data, which is received from the external device, from the serial I/O device to the memory;
wherein the serial I/O device includes:
a transmission buffer in which the transmission data transmitted from the memory can be stored;
a reception buffer in which the received data, received from the external device, can be stored; and
a control circuit, coupled to the transmission buffer and the reception buffer, for transmitting the transmission data in the transmission buffer to the external device when there is a space to store data to be received from the external device in the reception buffer of the serial I/O device of the data processor.

2. The data processor according to claim 1, wherein:
the serial I/O device further includes a reception control circuit which provides the second activation request signal to the reception direct memory access controller when data is stored in the reception buffer; and
the transmission control circuit provides the first activation request signal to the transmission direct memory access controller when there is space available for data storage in the transmission buffer, the transmission control circuit referring to the reception buffer to check whether there is space available for data storage in the reception buffer.

3. The data processor according to claim 2, wherein the serial I/O device includes:
a storage device for registering an operation mode of the serial I/O device, wherein the reception control circuit and the transmission control circuit each refer to the operation mode registered in the storage device for determining whether to perform transmission and reception of data with the transmission and reception direct memory access controllers or with the central processing unit.

4. A communication method using a data processor including a bus, a central processing unit coupled to the bus, a memory coupled to the bus a serial I/O device connected to the bus and connectable to an external device for simultaneously transmitting and receiving data to and from the external device, a transmission direct memory access controller coupled to the bus for transferring transmission data, which is to be transmitted to the external device, from the memory to the serial I/O device, and a reception direct memory access controller coupled to the bus for transferring received data, which is received from the external device, from the serial I/O device to the memory, the serial I/O device having a transmission buffer for storing the transmission data from the memory and a reception buffer for storing the received data, the communication method comprising:
transmitting the transmission data in the transmission buffer to the external device when there is a space to store data to be received from the external device in the reception buffer of the serial I/O device of the data processor.

5. The communication method according to claim 4, wherein said disabling includes:
suspending transmission of the transmission data when transmission data is stored in the transmission buffer and the reception buffer has no space available for data storage, until the received data stored in the reception buffer is transferred to the memory by the reception direct memory access controller in accordance with the direct memory access process and space for data storage is ensured in the reception buffer.

6. The communication method according to claim 4, further comprising:
determining whether an operation mode for the serial I/O device is a DMA mode in which the transmission and reception direct memory access controllers transfer transmission and received data in accordance with the direct memory access process or a CPU mode in which the central processing unit performs processing to transfer the transmission and received data, wherein the starting conditions further include the operation mode being the DMA mode.

7. The communication method according to claim 6, further comprising:
validating the starting conditions when the operation mode is the DMA mode, and invalidating the starting conditions when the operation mode is the CPU mode.

8. The communication method according to claim 6, further comprising:

using a storage device to register the operation mode of the serial I/O device.

9. A binary synchronous serial I/O device for use in a data processor, the data processor including a transmission direct memory access controller for reading transmission data stored in a memory in accordance with a direct memory access process, a reception direct memory access controller for storing received data provided from an external circuit of the data processor in the memory by performing a direct memory access process, and a bus coupling the binary synchronous serial I/O device, the memory, the transmission direct memory access controller, and the reception direct memory access controller, the binary synchronous serial I/O device comprising:

a transmission buffer, coupled to the bus, for temporarily storing the transmission data;

a reception buffer, coupled to the bus, for temporarily storing the received data provided from the external circuit;

a transmission control circuit, coupled to the transmission buffer and the reception buffer transmitting the transmission data in the transmission buffer to the external circuit when there is a space to store data to be received from the external circuit in the reception buffer of the serial I/O device of the data processor; and a reception control circuit, coupled to the transmission buffer and the reception buffer.

10. The serial I/O device according to claim 9, further comprising:

a register in which a central processing unit connected to the bus registers an operation mode of the serial I/O device, wherein;

the operation mode is either one of a DMA mode, in which the transmission and reception direct memory access controllers transferring the transmission data and the received data by performing a direct memory access process, and a CPU mode, in which the central processing unit performs processing for transferring the transmission data and the received data;

the transmission control circuit determines whether the operation mode is the DMA mode or the CPU mode by referring to the register; and the starting conditions further include the operation mode being the DMA mode.

\* \* \* \* \*